United States Patent [19]
Thomas

[11] 3,751,023
[45] Aug. 7, 1973

[54] SUSPENSION DEVICES

[76] Inventor: John Henry Thomas, 2 Merriville Rd., Cheltenham, England

[22] Filed: Oct. 7, 1971
[21] Appl. No.: 187,314

[52] U.S. Cl.............................................. 267/64 R
[51] Int. Cl............................................... F16f 5/00
[58] Field of Search.................................... 267/64 R

[56] References Cited
UNITED STATES PATENTS

| | | | |
|---|---|---|---|
| 2,769,632 | 11/1956 | Bourcien De Carbon | 267/64 |
| 3,007,694 | 11/1961 | Bingaman | 267/64 |
| 3,077,345 | 2/1963 | Andersson et al. | 267/64 |

Primary Examiner—James B. Marbert
Attorney—Holman & Stern

[57] ABSTRACT

A suspension device comprises a pair of telescopically engaged members which define at least a pair of chambers which are reduced in volume as the members are moved inwardly relative to each other. One of the chambers is filled with a gas under pressure and the other chamber is filled with a liquid. Moreover, a valve assembly is provided which when the rate of closure of the members exceeds a predetermined value closes to increase the resistance to the closing movement of the members.

11 Claims, 3 Drawing Figures

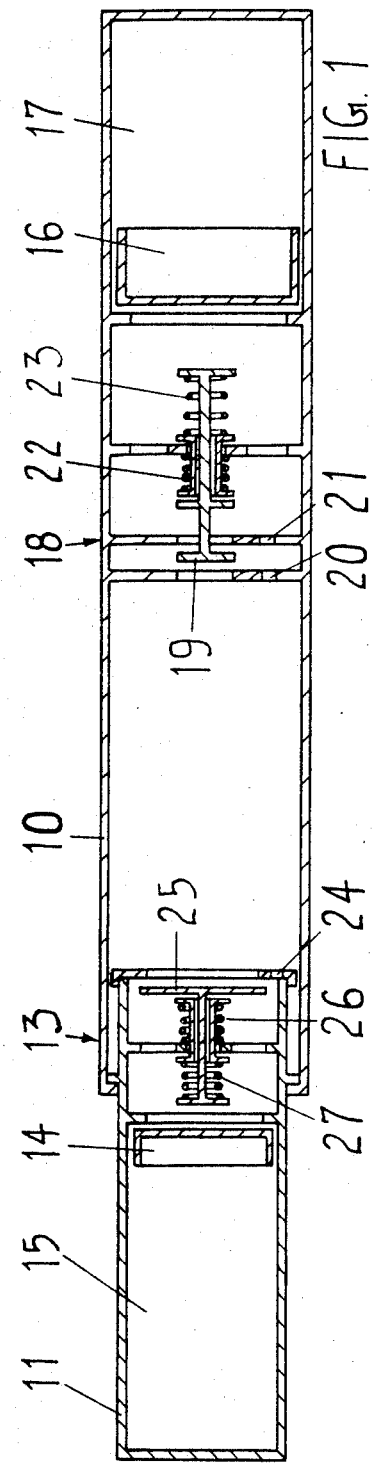
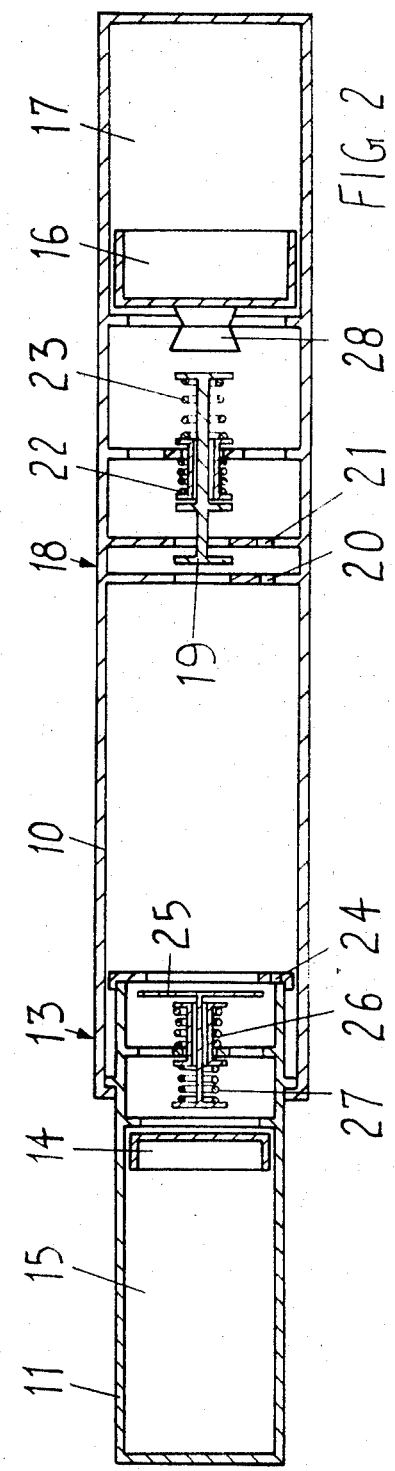

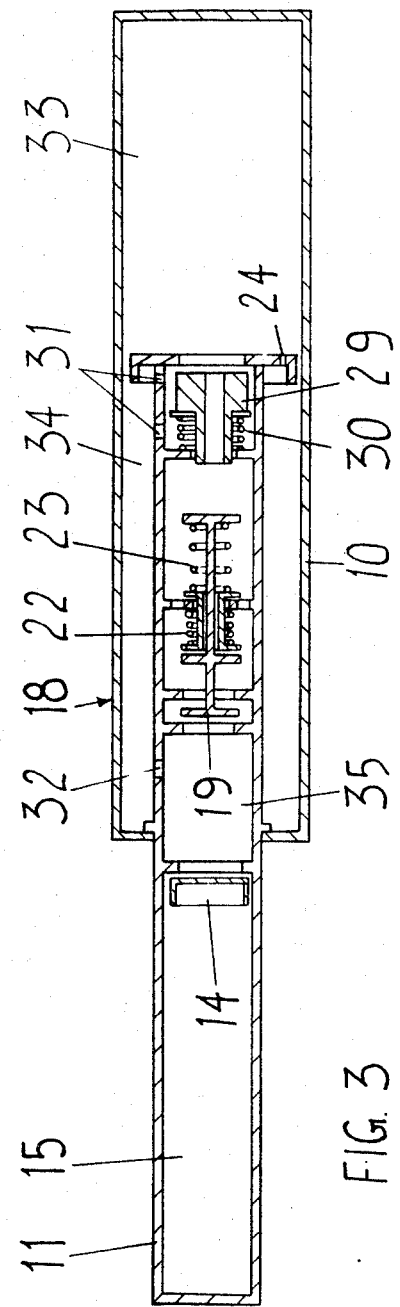

SUSPENSION DEVICES

This invention relates to suspension devices of the kind more commonly known as oleo-pneumatic springs and comprising a pair of telescopically engaged members defining a pair of chambers one of which is filled with liquid and the other of which is filled with gas, the total volume of the chambers being reduced as the members are closed relative to each other, the reduction in total volume being obtained as a result of compression of the fluids.

The object of the invention is to provide such a device in a simple and convenient form.

According to the invention a device of the kind specified includes a valve operable when the rate of closure of the members exceeds a first predetermined value, to increase the resistance to the closing movement of the members.

In the accompanying drawings the three FIGS. are sectional side elevations of three examples of suspension devices in accordance with the invention.

With reference to FIG. 1 the device includes a casing member 10 in which is telescopically engaged a further casing member 11. The casing members have closed outer ends and a seal arrangement is provided between the members to prevent leakage of fluid therefrom. Slidable within the casing member 11 is a free piston 14 which defines with the interior of the member a chamber 15. The maximum volume of the chamber 15 is determined by a stop which determines the outward movement of the piston 14.

In like manner the inner end of the casing member 10 is provided with a free piston 16 and this defines with the casing member a chamber 17. The space defined between the pistons is filled with liquid and the chambers 15 and 17 are occupied by gas under pressure. Adjacent the piston 16 is located a valve assembly 18 which includes a plate like valve element 19 disposed between a pair of spaced seat defining members in which are formed restricted orifices 20, 21. Moreover, the element 19 has associated therewith a pair of coiled springs 22, 23 which are so arranged as to act in opposite directions on the valve element.

Furthermore, adjacent the piston 14 there is located a further valve assembly 13 which includes a valve element 25 and a seating member in which is formed an orifice 24. A spring 26 resists movement of the element away from the seating member and a spring 27 resists movement of the element towards the seating member.

The device constitutes a two stage oleo-pneumatic spring particularly suitable for aircraft use and its operation will be considered in relation to such use. Consider the situation when the aircraft is about to land. In this situation the device is extended fully as is shown, and assuming that the pressure in the chamber 17 is lower than that in the chamber 15 then the initial compression of the members will effect compression of the gas in the chamber 17. However if the flow rate is sufficiently high the valve element 19 will move into contact with the seating member and the flow of fluid will be halted apart from the small flow of oil through the orifice 21.

With the valve element 19 in the closed position the device acts as a single chamber oleo-pneumatic spring and chamber 15 will reduce in volume and will absorb kinetic energy obtaining as a result of landing the remainder being dissipated as heat by the flow of oil through orifice 21, while simmultaneously raising the pressure in chamber 17 at a slower rate. During recoil the valve assembly 13 will remain in the open position until the flow rate across the assembly is sufficient to overcome the force exerted by the spring 27. If the flow rate exceeds this value then the valve element closes and the remaining recoil movement is damped.

The size of the orifice 21 is so chosen that the compression of chamber 15 during the landing is completed before the pressure in chamber 17 has built up sufficiently to enable spring 22 to move the valve element 19 away from the seating member. When recoil is completed the pressure in both chambers 15 and 17 will be substantially equal and both valve assemblies will be open. Hence any shock loads resulting from taxying over rough ground will act on both chambers simultaneously inducing undamped oscillation until the flow rate through valve assembly 18 is such as to cause the valve element to move into contact with the seating member associated with orifice 21. When this occurs the additional energy is opposed by the stiffer spring constituted by the chamber 15. On recoil with the expansion of both chambers, valve assemblies 13 and 18 will remain open until the flows exceed the respective critical values and then the valve elements thereof will close to damp the recoil action.

If the pressures in the chambers 15 and 17 are reversed then the valve assembly 18 will operate later in the cycle of operation described.

In the device shown in FIG. 2 all the components are identical with the device of FIG. 1 with the exception that an extra compressible chamber 28 is provided conveniently by a pre-charged flexible bag. Moreover, the pressure within the chamber 17 is higher than that in the chamber 15 and the pressure within the chamber 28 is such as to ensure that upon closing of the members 10, 11, together during the initial part of the landing of the aircraft, the valve element 19 closes onto the seating member thereby isolating the chamber 17. Moreover, the volumetric change of the chamber 28 also accommodates the volume of oil which flows through the orifice 21 whilst the compression of chamber 15 occurs.

The device shown in FIG. 3 includes the members 10 and 11 but in this case the member 10 is larger in diameter to define with the member 10 an annular chamber 34. Moreover, the valve assembly 13 is omitted and the valve assembly 18 is disposed within the member 11. Defined between the assembly 18 and the piston 14 is a chamber 35 and this is in communication with the chamber 34 through a port 32. Moreover, the piston 16 and the gas filled chamber 17 are omitted. The piston is replaced by a piston like head on the member 11 and apart from chamber 15 which is filled with gas, the remaining volumes are filled with oil. The head is provided with a restricted orifice 24 which performs the same function as the orifice 24 of the examples of FIGS. 1 and 2. The device also includes a differential valve 29 which is spring loaded onto the head by means of a spring 30. The valve in the closed position covers an aperture in the head to prevent communication of the chamber 34 with the chamber 33 by way of ports 31. However, there is direct communication between the chambers 33 and 35 by way of a passage in the valve 29.

In operation, the initial closing of the members 10, and 11 upon landing results in a small flow of oil from the chamber 33 to the chamber 35 by way of the valve assembly 18. However, this flow causes movement of the valve element 19 onto the seating member against the action of the spring 23. As the pressure in the chamber 33 continues to rise the valve member 29 is moved against the action of its spring to allow the oil to flow through ports 31 and 32. The gas in the chamber 15 is thus compressed and the energy is absorbed.

When recoil occurs the valve element 19 moves onto the other seating member against the action of the spring 22 and oil can only flow into the chamber 33 through the orifice 24. When the pressure in the chamber 33 approaches the pressure in the chambers 34, 35 and 15 the valve element 19 moves to the open position. If during taxying the amplitude of movement is small then the valve element 19 remains in its intermediate position and the device acts as an undamped spring. If the amplitude and rate of movement increases then the valve element 19 will move onto one or the other of the seating members so that during the compression of the device the springing is hardened by the action of the differential valve 29 and the recoil movement is damped by the operation of the restricted orifice 24.

I claim:

1. A suspension device comprising a pair of telescopically engaged members defining a pair of chambers one of which is filled with liquid and the other of which is filled with a gas, the total volume of the chambers being reduced as the members are closed relative to each other, the reduction in total volume being obtained as a result of the compression of the fluids and a normally open valve for controlling the flow of liquid which occurs due to compression of said gas, said valve being operable when the rate of closure of the members exceeds a first predetermined value, to increase the resistance to the flow of liquid and thereby the closing movement of the members.

2. A device as claimed in claim 1 including a further chamber filled with gas, one of said gas filled chambers being substantially isolated by operation of said valve in the event that the rate of closure of the members exceeds said first predetermined value, thereby to increase the resistance to the closing movement of the members.

3. A device as claimed in claim 2 in which said valve when the rate of flow into said one chamber is below said first predetermined value allowing unrestricted flow to said one chamber.

4. A device as claimed in claim 3 in which said valve when the rate of flow out of said one chamber exceeds a second predetermined value, operates to limit the rate of flow out of said one chamber.

5. A device as claimed in claim 4 including a further valve associated with the other gas filled chamber, said further valve operating when the rate of flow out of said other chamber exceeds a third predetermined value, to restrict said flow.

6. A device as claimed in claim 5 including a third gas filled chamber associated with said one chamber, said third chamber containing gas at a lower pressure than the gas in said one chamber, said third chamber collapsing during closing movement of the members to cause said valve to substantially isolate said one chamber.

7. A device as claimed in claim 2 in which said one and the other gas filled chambers are defined by free pistons slidable in the members respectively.

8. A device as claimed in claim 4 in which said valve comprises a valve element disposed between a pair of spaced seating members, said valve element being loaded by a pair of springs to a position intermediate said seating members, said springs operating to resist movement of the element onto the seating members respectively, said seating members each having a restricted orifice formed therein to permit restricted contraction or expansion of said one gas filled chamber.

9. A device as claimed in claim 1 including a differential valve arranged when said valve has operated to restrict the rate of flow into said gas filled chamber.

10. A device as claimed in claim 9 in which said valves when the rate of closure of the members is below said predetermined value allow substantially unrestricted flow into said gas filled chamber.

11. A device as in claim 10 in which said valve in the event that the rate at which the members open exceeds a second predetermined value operates so as to cause restriction of the rate of flow out of said gas filled chamber.

* * * * *